United States Patent [19]

Kollar et al.

[11] 3,806,061

[45] Apr. 23, 1974

[54] TAPE TRANSPORT

[75] Inventors: Ernest P. Kollar, Broomfield; Joel M. Levine; James M. Tagawa, both of Boulder, all of Colo.

[73] Assignee: International Business Machines Corporation, Armonk, N.Y.

[22] Filed: Oct. 20, 1970

[21] Appl. No.: 82,397

[52] U.S. Cl. .............. 242/186, 242/75.51, 242/202, 242/204

[51] Int. Cl.. G11b 15/46, G11b 15/30, G11b 15/43

[58] Field of Search ........... 242/201, 202, 204, 207, 242/205, 206, 208, 209, 210, 57, 186, 191, 75.5, 75.51, 203, 67.5, 192, 189, 190, 155 M, 54; 310/93; 192/84 PM, 53 D

[56] References Cited

UNITED STATES PATENTS

| | | | |
|---|---|---|---|
| 2,603,678 | 7/1952 | Helmer | 310/93 X |
| 3,034,744 | 5/1962 | Bancroft | 242/155 M |
| 3,109,603 | 11/1963 | Berlant | 242/202 |
| 3,197,151 | 7/1965 | Sparks et al. | 242/202 X |
| 3,294,332 | 12/1966 | Miville et al. | 242/67.5 X |
| 3,667,701 | 5/1972 | Blum | 242/192 |
| 2,217,183 | 10/1940 | Ross | 242/179 |
| 2,746,691 | 5/1956 | Hoad | 242/207 |
| 2,325,885 | 8/1943 | Serrurier | 242/206 |
| 2,718,361 | 9/1955 | Evraets | 242/203 |
| 3,090,573 | 5/1964 | Matovich, Jr. | 242/202 |
| 3,348,107 | 10/1967 | Hamby | 242/75.51 X |

*Primary Examiner*—George F. Mautz
*Attorney, Agent, or Firm*—Herbert F. Somermeyer

[57] ABSTRACT

A reel-to-reel transport has a single reversible motor. Constant-torque constant force magnetic couplings provide drag to the respective spools via one-way clutches. Other one-way clutches direct drive the spool in opposite rotational senses. The drag and one-way clutches brake the spools whenever the motor is turned off. Motor control is either by differentially sensing the speed of the spools or by sensing the speed of the web passing a transducing station.

8 Claims, 5 Drawing Figures

INVENTORS
ERNEST P. KOLLAR
JOEL M. LEVINE
JAMES M. TAGAWA
BY Herbert Sonnemeyer
ATTORNEY

TAPE TRANSPORT

BACKGROUND OF THE INVENTION

The invention relates to magnetic tape transports, particularly in the reel-to-reel type for providing tape tension using direct-drive connections to take-up spool with a soft constant-torque drag on the pay-out spool.

In bidirectional reel-to-reel tape transports, it has been common practice to drive the spools of tape via one-way or overrunning clutches. Such arrangements permit either spool to take up or pay out tape. In some instances, friction drags or brakes have been incorporated in connection with the one-way clutches for tensioning the tape as it is paid out from the spool. Such a drag-brake arrangement does not necessarily provide a constant drag. In magnetic tape systems, it is highly desirable that the tape be transported over a transducer under uniform tension. This arrangement is desirable for maintaining a constant quality of recording and signal reproducing.

Many reel-to-reel tape transports are designed for low-cost, low-performance applications. In such applications, it is extremely important that the tape transport be made as simple as possible and yet enable relatively high-quality signal processing.

SUMMARY OF THE INVENTION

It is an object of this invention to provide an extremely simple, but effective, reel-to-reel transport having improved cost performance.

A reel-to-reel tape transport using the present invention need not have a tape-driving capstan, although one may be used. A pair of spools may be alternately driven through a single-motor, single-belt drive system. A one-way clutch magnetic coupling arrangement direct drives a spool and simultaneously provides soft constant-torque magnetic drag on the pay-out spool. Spool velocities are differentially sensed for controlling motor speed to provide a constant velocity across a magnetic transducer. The soft magnetic drag is a constant-torque drag providing a uniform tension on the tape. Two of the one-way clutches, one associated with each of the spools, are arranged such that as soon as the motor stops, the one-way clutches lock for preventing rotation of the spools in either direction. This locking engagement occurs at a desired tape tension across the transducer. In another version, tape marks are sensed and used for velocity control. Other tape-velocity control concepts may be used.

The preferred spool-drive arrangement has a spool spindle journalled for rotation coaxially with a magnetic member. The magnetic member is connected to the frame via a one-way clutch which permits relative rotation in one direction and locking engagement in the opposite direction. A second magnetic member is disposed coaxially of the spool spindle in magnetic coupling relationship to the first member. A one-way clutch is disposed between a driving shaft and the second magnetic member and arranged to permit free rotation in the opposite rotational sense to that of the first one-way clutch. When the driving shaft is rotated in the driving direction, both magnetic members rotate with the spool spindle and the drive shaft; however, when the spool spindle is rotated in the opposite (drag direction) sense, the driving one-way clutch permits free rotation with respect to the driving shaft with the first one-way clutch providing locking engagement between the first magnetic member and the frame. The magnetic coupling provides a constant-torque drag on the spool spindle. Both spool spindles are connected to the just-described drive-drag arrangement. The couplings are preferably identically constructed. Various mechanical arrangements using the pair of one-way clutches and the magnetic members can be made to accomplish the same function.

The foregoing and other objects, features, and advantages of the invention will be apparent from the following more particular description of preferred embodiments of the invention, as illustrated in the accompanying drawings.

THE DRAWINGS

DETAILED DESCRIPTION

Figures 1, 2:
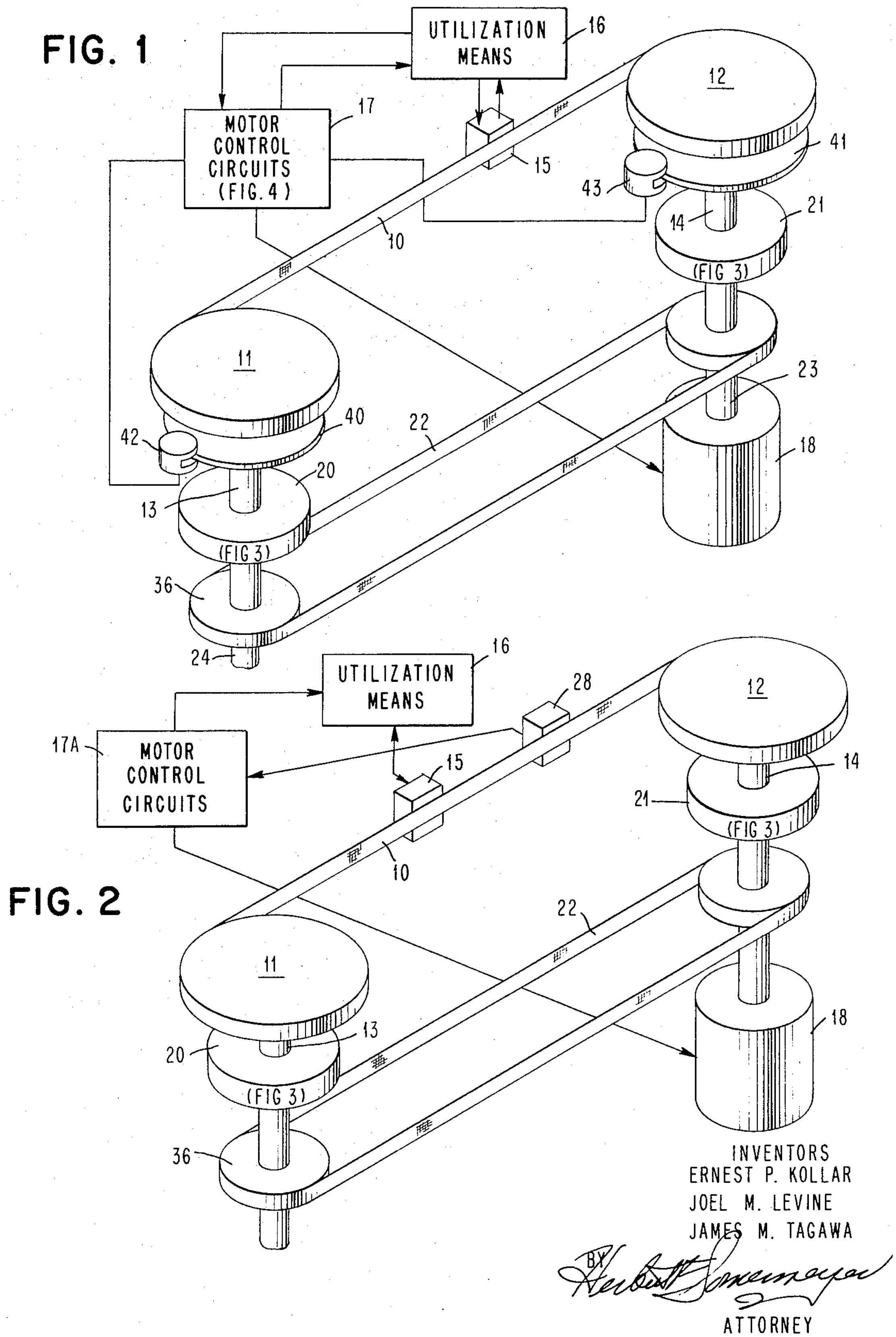
FIG. 1 is a simplified diagrammatic view of a tape transport illustrating the present invention.
FIG. 2 is a diagrammatic perspective view of a second embodiment of the present invention.

Referring now more particularly to the drawings, like numbers indicate like parts and structural features in the various views.

Magnetic tape or other web 10 is selectively bidirectionally transported between spools 11 and 12 respectively mounted for rotation on spool spindles 13 and 14. Magnetic transducer 15 is arranged for transducing operations with web 10. Utilization means 16 exchanges electrical signals with transducer 15. Motor control circuit 17 responds to utilization means 16 for actuating motor 18 to drive web 10 past transducer 15.

A reversible DC motor 18 is connected to spool spindles 13 and 14 via a magnetic drag one-way clutch system. Unidirectional drive assemblies 20 and 21 selectively rigidly (a non-slip connection) couple motor 18 shaft to spools 11 and 12 respectively in opposite rotational senses. Single belt 22 connects motor drive shaft 23 to driving shaft 24 in assembly 20. When motor 18 rotates clockwise, drive assembly 21 makes a rigid connection between motor 18 shaft and spool spindle 14. Simultaneously, clockwise rotation of driving shaft 24 frees assembly 20 to provide a constant-torque drag on spool spindle 13. A constant-torque drag is important in a magnetic tape transport to provide uniform tension on web 10 as it passes transducer 15 during transducing operations. When motor 18 rotates in counterclockwise direction, drive assembly 20 makes a rigid driving connection between driving shaft 24 and spool spindle 13. Drive assembly 21 automatically responds to the counterclockwise rotation to provide a constant-torque drag to spool spindle 14.

Drive assemblies 20 and 21 are identically constructed such that the drag on web 10 is the same in either direction of tape transport. Motor control circuit 17 responds to the differential velocities of spools 11 and 12 to control motor 18 in accordance with the amount of web on the take-up spool as will be later explained.

FIG. 2 is the same as FIG. 1 except that the motor control circuit is constructed differently. Motor control circuit 17A is responsive to marks on web 10 passing timing transducer 28 to supply control signals to motor 18.

Signals from timing head 28 are integrated by control circuit 17A to provide a velocity indication of web 10. This velocity is compared with the desired velocity such that control signals applied to motor 18 are varied to maintain web 10 at a desired velocity. Such circuits are well known and are not further described. The rest of the tape transport shown in FIG. 2 is identical to the FIG. 1 illustrated embodiment.

Figures 3, 5:
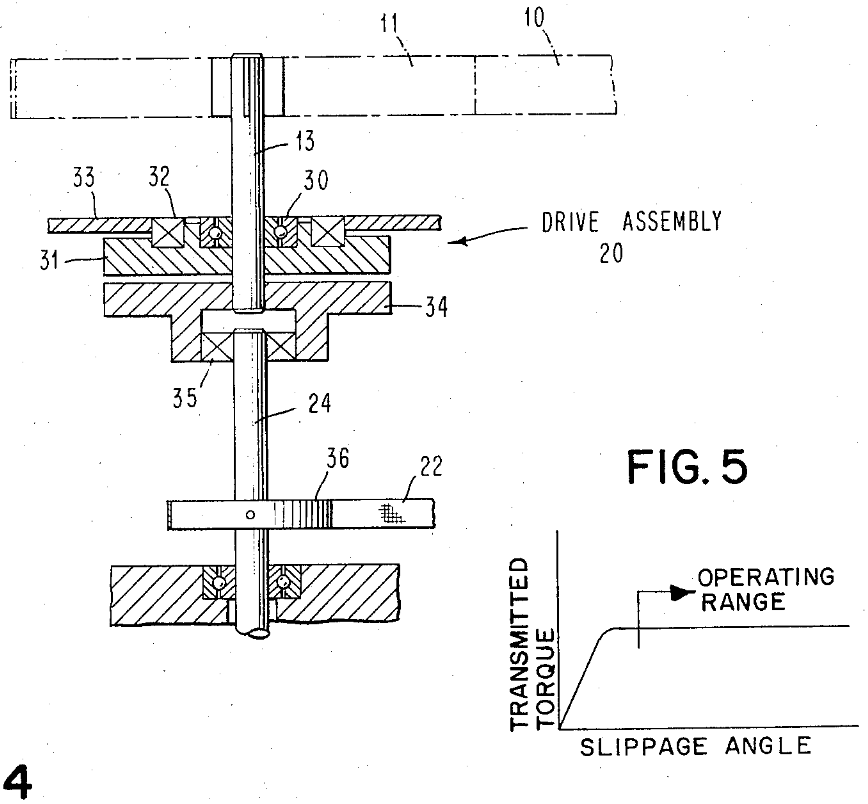
FIG. 3 is a diagrammatic sectional view of a spool-driving arrangement usable with either the FIG. 1 or FIG. 2 illustrated embodiment.
FIG. 5 is a graph illustrating torque transmission characteristics of a constant torque clutch.

An important aspect of the invention is the drive assemblies 20 and 21. Drive assembly 20 is explained in detail with respect to FIG. 3. Assembly 21 is identically constructed except that the one-way clutches (later described) are arranged to permit free rotation in opposite senses to that described for drive assembly 20. In assembly 20, spool spindle 13 is journalled for rotation in bearing 30. Bearing 30 is supported by a first magnetic member 31. Member 31 is rotationally supported by one-way clutch 32 fixedly secured in frame 33. Second magnetic member 34 is secured to spindle 13 for rotation therewith. Mounted on member 34 is second one-way clutch 35. Clutch 35 unidirectionally connects driving shaft 24 to second magnetic member 34.

When spool 11 is driven to spool in web 10, driving shaft 24 is rotated counterclockwise by belt 22 rotating pulley 36. One-way clutch 35 locks magnetic member 34 and spindle 13 to shaft 24 for rotation therewith. One-way clutch 32 permits free rotation between first magnetic member 31 and frame 33. Therefore, in drive assembly 20, during driving engagement, both magnetic members rotate with driving shaft 24 and spool spindle 13. No losses are introduced into the drive train by relative rotation of the two magnetic members.

When spool 11 is used as a pay-out spool, relative rotation occurs between members 31 and 34 providing a constant-torque drag on spool 10.

Hysteresis property of one of the magnetic members provides constant torque. This action is not to be confused with an eddy-current clutch wherein the eddy currents induced in one member provide a magnetic coupling which varies with relative velocities of the two members. This latter arrangement provides a variable torque. See Helmer U.S. Pat. No. 2,603,678 at Column 2. In contradistinction, when magnetic member 34 is a permanent magnet magnetized with several poles disposed on the circular periphery and magnetic member 31 is a permeable member, a constant maximum torque is provided between the two members. This constant maximum torque is believed to be provided by the virtual magnetic poles induced in member 31 by permanent magnet member 34. As member 34 rotates with respect to member 31, the virtual poles also move within member 31. This amounts to remagnetization of member 31 which uses energy and thereby provides a drag on member 34. It is well known that this type of drag builds up to a maximum and then remains constant even though relative rotation increases.

The Helmer U.S. patent, supra, beginning at line 20 of Column 3, discusses hysteresis coupling, showing distinct operational differences from the eddy-current couplings. In Column 6 of Helmer, it is stated that the torque transmitted is inversely proportional to RPM to yield a constant power transfer. The operation of the preferred clutches differs in operation from both of the Helmer-described clutches. With the use of facing cylindrical clutch plates or members with the remanent magnetization along the axis of rotation, as opposed to radial coupling as in Helmer's disclosed hysteresis clutches, constant torque is provided.

The operation of the one-way clutches with respect to the magnetic members for providing the constant-torque drag is a key aspect of the present drive assembly. During tape payout from spool 11, spindle 13 is rotated clockwise by the tape 10 moving to spool 12. Spindle 13 rotates freely within bearing 30. One-way clutch 35 permits free rotation with respect to driving shaft 24 which is rotating clockwise at a much higher rotational velocity than spindle 13. The design of the system requires that the diameter of pulley 36 be less than the diameter of the hub in spool 11. In this manner, one-way clutch 35 will always permit free relative rotation between pulley 36 and spool 11 irrespective of the amount of tape thereon. Drive assembly 21 operates in the same way in an opposite rotational sense.

Another important aspect of the drive assemblies is the cooperative relationships between the one-way clutches attached to frame 33. If power is removed expectedly or unexpectedly from motor 18, both spools 11 and 12 are held against rotation by the connection of tape 10 therebetween and the coaction of the one-way clutches 32. The one-way clutch in drive assembly 20 via magnetic couplings 31 and 34 prevents spool 11 from rotating counterclockwise. In a similar manner, the one-way clutch in drive assembly 21 prevents spool 21 from rotating clockwise. Since tape 10 is fixedly secured to both spools, neither spool nor the tape will move under such conditions. Only when motor 18 is rotated in one direction or the other will tape movement be effected. Such action prevents the unintended unspooling of tape 10 from either of the spools during a power turnoff or loss.

Figure 4:
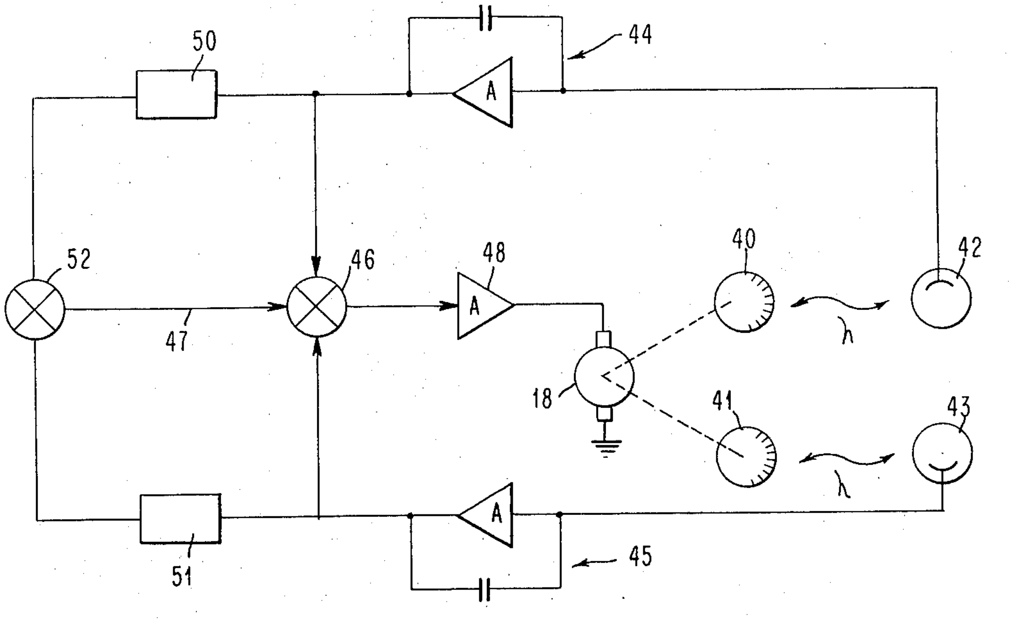
FIG. 4 is a simplified motor-control circuit for use with the FIG. 1 illustrated embodiment.

Differential motor control circuit 17 is shown in simplified form in FIG. 4. Spools 11 and 12 respectively have tachometer disks 40 and 41. Adjacent the tachometer disks are a pair of sensors 42 and 43 for sensing tachometer marks. The output signals of these two photodetectors indicate the relative velocities of the two reels and have the differential velocity. The differential velocity is tape speed. Integrators 44 and 45 integrate the photodetected signals to provide a DC signal indicative of the respective reel velocities. Analog summer 46 receives the two velocity signals, compares same with a speed-reference signal received over line 47, and supplies a control signal to servo amplifier 48 for controlling motor 18. Servo action is well-enough known not to warrant further discussion.

The speed-reference signal on line 47 is generated from the integrated reel velocity signals. Since the tape area on both spools is always a constant, i.e., the amount of tape is always the same, it follows that the sum of the squares of the radii of the tape on the spools is always constant: Then, $R1^2 + R2^2 = K1$, wherein R1 is the tape radius on spool 11, R2 is the tape radius on spool 12, and K1 is a constant. From this, it follows that the sum of the reciprocals of the squares of angular velocities of the spools is a constant: $(1/\omega 1^2) + (1/\omega 2^2) = K2$ wherein K2 is the speed-reference signal on line 47 and the $\omega$'s are the relative angular velocities of the two spools. Analog circuits 50 and 51 respectively provide the terms $(1/\omega 1^2)$ and $(1/\omega 2^2)$ to current summer 52. The output signal is K2 on line 47.

While the invention has been particularly shown and described with reference to preferred embodiments thereof, it will be understood by those skilled in the art that various changes in form and details may be made therein without departing from the spirit and scope of the invention.

What is claimed is:

1. A reel-to-reel tape transport on a frame and having single reversing-drive means and first and second spool spindles, including the combination:

first and second shafts supporting said spindles, each shaft respectively having first and second magnetic members;

third and fourth shafts respectively coaxially rotatably disposed with respect to said first and second shafts;

first and second one-way clutches disposed coaxially with respect to said first and second shafts and respectively arranged for permitting free rotation in first and second rotational senses and locking engagement in second and first rotational senses, said clutches being mounted on said frame;

third and fourth magnetic members respectively mounted on said first and second one-way clutches and being in magnetic-coupling relation to said first and second members and having means journalling said first and second shafts for rotation;

third and fourth one-way clutches respectively interposed between said first and second members and said third and fourth shafts for permitting relative rotation in second and first rotational senses and locking engagement in first and second rotational senses;

said drive means being in driving relationship with said fourth shaft; and belt means in driving engagement with said third and fourth shafts.

2. A tape spool driving-drag arrangement including the combination:

a magnetic clutch having a drag member and a driving member, a driven shaft journalled for rotation within said drag member for drivingly engaging a tape spool and said driving member being secured thereto at one end, a driving shaft axially aligned with respect to said driven shaft, one-way clutch means mounted on said driving shaft and connected to said driving member for permitting free rotation in a first rotational sense and driving engagement in a second rotational sense, and one-way clutch means including stationary reference means and connected to said drag member for permitting free rotation in said second sense and locking engagement in said first sense whereby a direct-driving engagement between said driving shaft and driven shaft is provided in a second rotational sense and a magnetic drag is provided in the opposite rotational sense.

3. The subject matter set forth in claim 2 wherein said magnetic clutch is a constant maximum torque type wherein one of said members is a permanent magnet with poles disposed around the periphery of the member with virtual magnetic poles being induced in the other member without substantial eddy currents.

4. A reel-to-reel tape transport having a pair of spool hubs, a single reversing drive means, the improvement including the combination:

velocity sensing means for sensing the relative velocities of said spool hubs and providing signals indicating velocities thereof, means combining said signals to provide a differential signal indicating speed differential;

motor control means responsive to said differential signal to control the reversible driving means for causing a constant velocity tape transport between spools when attached to said spool hubs; and magnetic brake and one-way clutch assemblies interposed between said driving means and said spool hubs and operative to provide a direct driving connection respectively in first and second rotational senses and a soft constant-torque magnetic dragging arrangement in senses opposite thereto, and said one-way clutch assemblies providing positive braking via said constant-torque magnetic brake assemblies respectively in said second and first senses whenever said driving means is inactive.

5. The subject matter of claim 4 further including speed-reference means jointly responsive to said velocity signals for generating a constant DC-reference potential indicative of desired speed, summing means in said motor control means jointly responsive to said velocity signals and to said reference signal to generate said differential signal as an error signal indicating change in velocity to reach a desired velocity indicated by said constant signal wherein the error signal never actually indicates true speed differential between said spool hubs.

6. The subject matter set forth in claim 5 wherein said spool hubs respectively have first and second depending shafts, said magnetic brakes each consisting of a drag and driving magnetic member with said driving magnetic members being respectively securely affixed to one end of said depending shafts;

one-way clutch means including frame means mounting said drag members for rotation in opposing rotational senses respectively and locking against rotation in senses opposite to said senses;

bearing means in said drag members respectively journalling said depending shafts for rotation; and means for selectively driving said driving members in first and second rotational senses.

7. The subject matter set forth in claim 6 wherein said driving means includes a pair of upstanding shafts each having a one-way clutch at an end portion thereof, said driving one-way clutches being respectively disposed on said driving members and being arranged for freeing rotation in first and second rotational senses and for locking engagement respectively in second and first rotational senses;

a motor affixed to one end of one of said upstanding shafts and having a pulley thereon, a pulley on a second one of said shafts; and belt means extending between said pulleys such that both spool hubs are reversibly rotatable by reversing direction of motor rotation.

8. A capstanless reel-to-reel tape transport on a frame and having single reversing-drive means, first and second spool spindles, the improvement including the combination:

separate means respectively independently coupling said drive means to said spool spindles for selectively making a non-slip driving connection therebetween;

separate constant-force drag means respectively operatively coupled to said spool spindles for providing a constant-torque drag on any tape transported between said spindles in either direction of transport and each comprising a magnetic coupling having two members;

one member in each said magnetic coupling being a permanent magnet with axially facing magnetic poles disposed around the periphery thereof;

a second member in each said magnetic coupling being a magnetically permeable member not capable of inducing substantial eddy currents therein nor capable of having a substantial remanent magnetization;

one-way clutch means in one of said coupling means interposed between said second spindle and said drive means for permitting relative rotation therebetween in a first sense of rotation and providing a non-slip driving engagement between said driving means and said second spindle in an opposite rotational sense; and second one-way clutch means in a second one of said coupling means and interposed between said first spindle and said drive means and arranged to permit free rotation in said opposite sense and providing non-slip driving engagement in said first rotational sense.

* * * * *